United States Patent [19]
Kitamura

[11] Patent Number: 5,756,037
[45] Date of Patent: May 26, 1998

[54] METHOD FOR INJECTING MOLTEN RESIN BY INJECTION MACHINE

[75] Inventor: Motomi Kitamura, Nagano-ken, Japan

[73] Assignee: Nissei Plastic Industrial Co., Ltd., Nagano-ken, Japan

[21] Appl. No.: 683,674

[22] Filed: Jul. 17, 1996

[30] Foreign Application Priority Data

Jul. 19, 1995 [JP] Japan ..................... 7-204094

[51] Int. Cl.$^6$ ........................................... B29C 45/52
[52] U.S. Cl. ........................ 264/328.1; 264/328.17; 425/208; 425/586; 425/587
[58] Field of Search ..................... 264/40.1, 328.1, 264/349, 328.17; 425/145, 146, 147, 582, 583, 587, 207, 208, 209, 586

[56] References Cited

U.S. PATENT DOCUMENTS

| | | | |
|---|---|---|---|
| 4,767,306 | 8/1988 | Kawaguchi et al. | 425/586 |
| 4,879,077 | 11/1989 | Shimizu et al. | 264/40.1 |
| 5,002,717 | 3/1991 | Taniguchi | 425/587 |
| 5,112,213 | 5/1992 | Oas | 425/587 |

FOREIGN PATENT DOCUMENTS

| | | |
|---|---|---|
| 452988 | 1/1970 | Japan . |
| 62-60621 | 3/1987 | Japan . |
| 63-178118 | 11/1988 | Japan . |
| 1192521 | 8/1989 | Japan . |
| 364291 | 4/1991 | Japan . |
| 596586 | 4/1993 | Japan . |

Primary Examiner—Jill L. Heitbrink
Attorney, Agent, or Firm—Weingarten, Schurgin, Gagnebin & Hayes LLP

[57] ABSTRACT

A method for injecting a molten resin by an injection machine comprises the steps of opening a ring valve mounted on an injection screw by the normal revolution of a injection screw thereof; metering the molten resin; stopping the revolution of said injection screw; moving said injection screw backward, performing the reverse revolution of the injection screw at the moved-back position for the required amount to generate a differential pressure; making the ring valve come in proximity to or into contact with a valve seat at the tip of a screw body of the injection screw by said differential pressure; and injecting the metered resin by the forward movement of the injection screw so as to complete the closure of the ring valve. According to the longer stroke of the injection screw, the ring valve is certainly closed by the backward, rotative and forward movements of the injection screw and thereby an injection operation is maintained more precisely in the dispersion of the injecting quantities than before.

2 Claims, 3 Drawing Sheets 5,756,037

METHOD FOR INJECTING MOLTEN RESIN BY INJECTION MACHINE

BACKGROUND OF THE INVENTION

1. Field of the Invention

The present invention relates to an injection method, and more particularly to a method for injecting a molten resin into a mold to produce molded articles made of synthetic resin.

2. Background Art

In a conventional injection machine, there is employed an injection screw which has a ring valve mounted on the periphery of a tip thereof to prevent a reverse flow and which is provided inside a heating cylinder so as that the injection screw can be forward, backward and rotatively moved therewithin. The normal revolution of said injection screw performs plasticization (fusing and kneading) of a synthetic resin material fed from a hopper at the rear part of the heating cylinder and metering (accumulation) of said material within the foremost end of the heating cylinder. Upon completion of the metering, the screw revolution is stopped to permit the injection screw to move forward, causing the metered material to be pushed by the injection screw and resulting in the injection of said material from a nozzle at the tip of the heating cylinder into the mold. In said injection machine, at the time of initiating forward movement of the injection screw, the pressure of the metered material rising due to the pushing pressure allows only the ring valve to move backward and to close the valve, resulting in the prevention of the metered material from flowing backward.

For the closing of the above-mentioned ring valve, a stroke required for closing the valve after the start of the injection is tentatively obtained by assumption from a moving stroke of the ring valve. However, possibly because the ring valve closing is carried out by the pressure of the metered material, there is a tendency for the weights of molded products to disperse. This weight dispersion, that is, the dispersion of the filled quantities is responsible for scattering precision of the resultant products and may give rise to many occurrences of inferior products.

The cause of such dispersion is attributed to the fact that the closing position of the ring valve in the process of injecting the metered material varies with each case of injection and that even though the stroke required for valve closing is tentatively determined by assumption, the valve closing is not performed in said stroke with certainty.

As a means of eliminating the dispersion by closing the ring valve accurately in the identical stroke for each case of injection, there has been devised a method in which the screw revolution is reversed upon completion of the metering of the material. Other methods include an operation arranged to permit the injection screw to advance concurrently with the reverse revolution. According to the prior art thus far disclosed, it is explained that when the injection screw is allowed to reverse its direction of revolution, a plasticized material on the periphery of the screw body is conveyed in the backward direction in a quantity equivalent to the amount of revolution, causing a pressure on the screw body side to decrease to a lower level than that on the metering side ahead of the injection screw. It is understood that this reduction creates a pressure difference between the metering side and the screw body side with the ring valve as the boundary, such that the ring valve is pushed by the pressure on the metering side and the rear end thereof to move it with certainty to a position in contact with the valve seat thus causing the valve to close. Consequently, it is stated that the reverse flow of the metered material is prevented and that the dispersion of the injection quantities is diminished.

However, there is no corroborating evidence of valve closing by the reverse revolution. It should also be noted that despite the backward movement of the ring valve toward the valve seat side actually occurring owing to a differential pressure, since the pressure environment surrounding the ring valve is in no way constant at all times as it depends on the plasticization state of the material, there are variations of the results of the backward operation of the ring valve through the reverse revolution, thus creating the dispersion of the injection quantities.

From these considerations, it should be clear that even use of the valve closing through the reverse revolution of the injection screw will not completely eliminate the dispersion of the injection quantities and that its effect of preventing the reverse flow is not substantial enough as compared with that of the normal injection method. In some cases, more dispersion rates have been noted. These findings underlie the continuing need for new methods of preventing the reverse flow with a high valve closing efficiency.

SUMMARY OF THE INVENTION

In order to solve the above-mentioned problems, an object of the present invention is to prevent the reverse flow of the metered material through the ring valve by reversing the revolution of the injection screw to certainly close the ring valve. It is also an object of the present invention to provide an improved injection method in an injection apparatus capable of preventing the reverse flow of the metered material with more certainty than hitherto available before the tip of the injection screw reaches the normally established position by assumption of the ring valve closing and restraining the dispersion of the charging quantity per each injection to extremely low levels.

The present invention provides a method for injecting a molten resin by an injection machine which comprises a heating cylinder, an injection screw comprising a screw body, a screw head forming the tip of the injection screw, and a valve seat provided on the tip of the screw body, said injection screw being forward, backward and rotatively moved within said heating cylinder, and a ring valve mounted on the periphery of the screw head of the injection screw for preventing the reverse flow of the metered molten resin in contact with said valve seat, the method comprising the steps of;

opening the ring valve by the normal revolution of the injection screw thereof;

metering the above-mentioned molten resin;

stopping the revolution of said injection screw;

moving said injection screw backward, performing the reverse revolution of the injection screw at the moved-back position for the required amount to generate a differential pressure;

making the ring valve come in proximity to or into contact with the valve seat by said differential pressure; and injecting the metered resin by the forward movement of the injection screw so as to complete the closure of the ring valve.

In the injection method according to the present invention, the ring valve moves backward by the backward movement of the injection screw while maintaining a valve-opening state. Thereafter, as a result of the reverse revolution of the injection screw at the moved-back position, the differential pressure generates before and after the ring valve so that the ring valve is pushed by the metering side pressure, backwardly moving to about where the rear end thereof falls into contact with the valve seat. Further, because of the forward movement of the injection screw from the moved-back position, the rear end of the ring valve comes into complete contact with the valve seat due to the resistance of the material from the metering side, effecting the valve closure.

The forward movement of the injection screw from the moved-back position may be made immediately after completion of the reverse revolution or concurrently with the reverse revolution. Said forward movement may be made after a halt at the moved-back position to be succeeded by the forward movement to the injection completion position or continue all the way to the injection completion position without halting. It is preferred to make the forward movement after a halt because higher valve closing effect is obtained.

Any drive means may be used for the injection machine, e.g. either of the hydraulic type one or the motor-operated type one. In terms of precision of the injection screw revolution, the motor-operated type injection machine is preferable.

The above and other objects, features, and advantages of the present invention will become more apparent from the description of the preferred embodiments with reference to the drawings, and from claims.

DETAILED DESCRIPTION OF THE PREFERRED EMBODIMENTS

Figure 1:
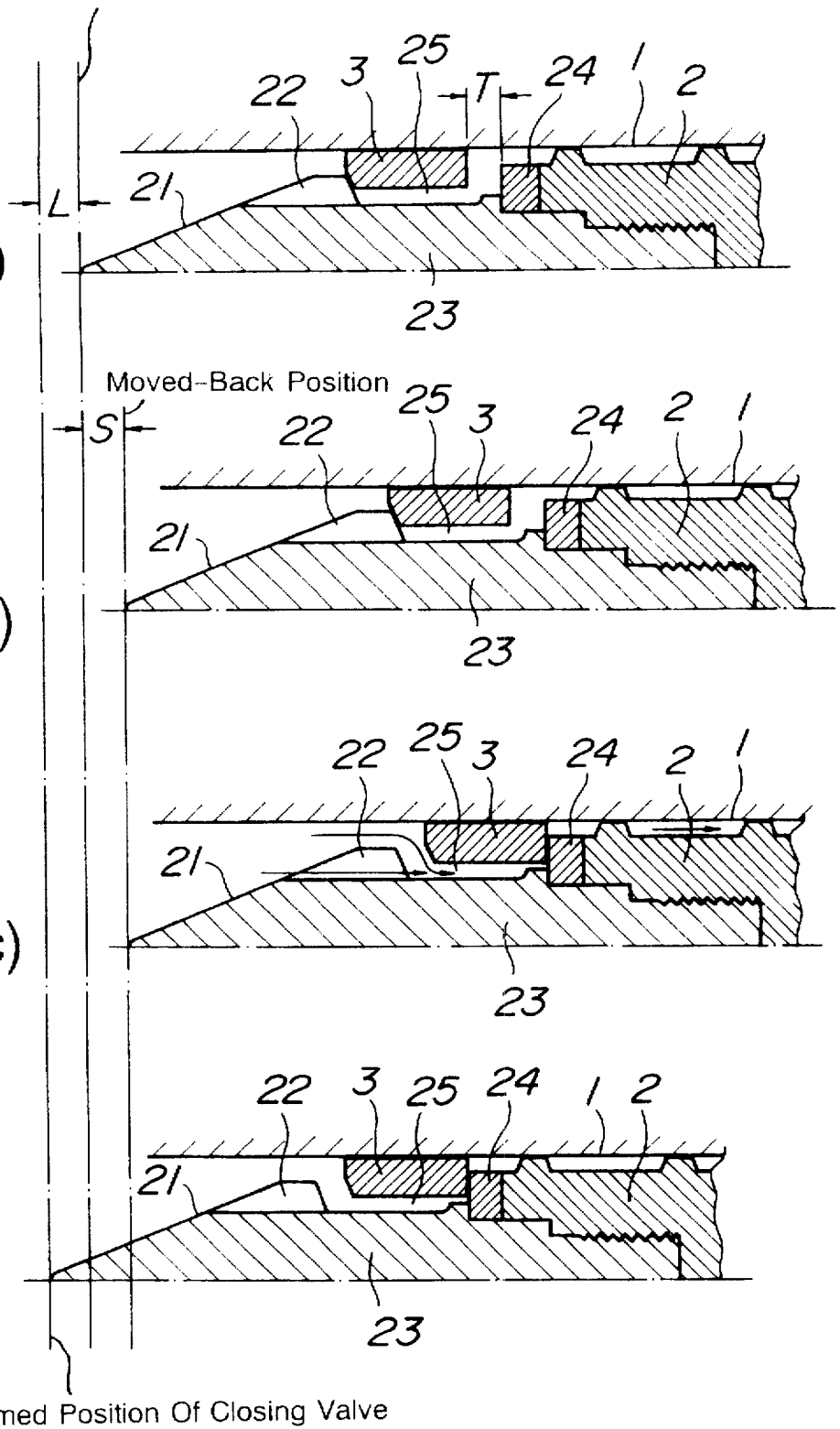
FIGS. 1(a), 1(b), 1(c), and 1(d) are explanatory flow diagrams showing the injection method according to the present invention.

In FIGS. 1(a)–1(d), numeral 1 designates a heating cylinder and numeral 2 designates an injection screw having a normal construction with a ring valve 3 mounted on the periphery of the tip thereof for the prevention of the reverse flow. The injection screw 2 is set inside the above-mentioned heating cylinder 2 with the freedom of forward, backward and rotative movements.

The tip of the above-mentioned injection screw 2 is comprised of a screw head 21 formed of a conical head having a plurality of recessed resin paths 22 on the side thereof and a shaft part 23 at the rear end of said conical head. The screw head 21 is fitted to the tip of a screw body by screwing a screw shaft provided on the rear end surface of the shaft part 23 into the center of the screw body, and a valve seat 24 at the tip surface of the screw body is held and fixed by a flange on the periphery of the rear portion of the shaft part 23.

A ring groove of the specified width is constituted at the periphery of the shaft part between the above-mentioned valve seat 24 and the conical head, and the above-mentioned ring valve 3 is mounted in the ring groove with the freedom of forward and backward movements with a transfer stroke T in an axis direction. The outer diameter of the ring valve 3 is approximately equal to the inner diameter of the above-mentioned heating cylinder 1, their difference staying within a range of clearance which enables forward and backward moving. The inner diameter of ring valve 3 is considerably larger than the outer diameter of the shaft part 23 so as that a passage 25 necessary for joining the above-mentioned resin path 22 to the screw side is formed in between the ring valve 3 and the shaft part 23.

It is assumed that while the injection screw 2 makes a forward movement in the same stroke L as the transfer stroke T, such ring valve 3 moves backward to the valve seat 24 by the pressure of the material on the metering side and closes the valve, and that the valve closing conducted at the predetermined position in each case is considered necessary to achieve stability in metering.

Figure 2:
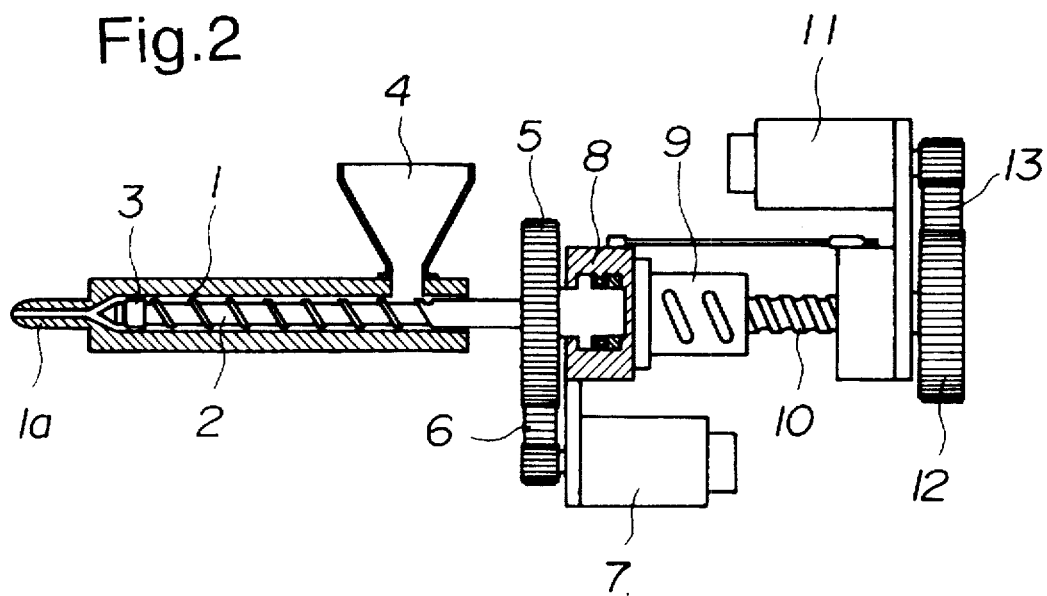
FIG. 2 is a schematic view of the motor-operated type injection machine which can execute the injection method according to the present invention.

FIG. 2 is an explanatory schematic view of the motor-operated injection apparatus in which granular materials from a hopper 4 provided at the rear part of the heating cylinder 1 is conveyed into the tip of the heating cylinder 1 so as to meter it while the material undergoes plasticization through the normal revolution of the above-mentioned injection screw 2. The revolution of the injection screw 2 is accomplished by means of a servomotor 7 running a gear 5 mounted at the rear end of the screw through a timing belt 6.

It should also be noted that the injection screw 2 moves backward subsequent to the metering. This backward movement is achieved by another servomotor 11 via a transmission mechanism composed of a nut member 9 of a screw holding unit 8 which is rotatably linked to the rear end of the screw and which is screwed to a ball thread shaft 10 at the fixed position to convert to the rotary movement of the ball thread shaft 10 by the nut member 9. The servomotor 11 for drive is connected to the rear end of the ball thread shaft 10 by way of a gear 12 and a timing belt 13 at the rear end. At the time of metering, the ball thread shaft 10 is subjected to a load by the servomotor 11 in a direction controlling the above-mentioned rotation so that back pressure control is performed.

In such motor-operated injection apparatus, the above-mentioned servomotor 7 stops upon completion of the metering of the material. Almost simultaneously, the load exerted by the servomotor 11 is reduced to allow the ball thread shaft 10 to revolve in reverse and the injection screw 2 is moved backward to the set position. When the injection screw reaches the moved-back position, the servomotor 11 stops, while the servomotor 7 operates to turn the injection screw 2 for about one revolution in reverse. After the revolution is completed, the servomotor 7 stops and the servomotor 11 operates to provide normal revolutions to push the injection screw 2 back to position prior to the being moved-back (the position of metering completion). After a halt, the servomotor 11 operates again to move the injection screw 2 forward, thereby causing the metered material to be injected from a nozzle 1a on the tip of the heating cylinder 1 into the mold.

The positional relationship between the injection screw 1 and the ring valve 3 in each step of the above-mentioned process is as illustrated in each view of FIGS. 1(a)–1(d) and the arrows indicate the directions of the material flow. It should be noted that the stroke L required for closing the valve, the temporary valve closing position and a stroke S required for the moved-back have been preset on the basis of the transfer stroke T of the ring valve 3.

At the position of metering completion shown in FIG. 1(a), the pushing pressure of the plasticized material to be conveyed forward by screw revolutions and the backward movement of the injection screw 2 make the ring valve 3 move from the valve seat 24 to the forward moved position in contact with the rear edge of the conical head to maintain the valve open status.

FIG. 1(b) shows that after the metering is completed, the injection screw 2 does not revolve but moves backward in the stroke S set for the same stroke as the above-mentioned transfer stroke T, performing the moving back. The front end of the ring valve 3 is pushed by the rear edge of the conical head and moves backward together with the injection screw 2, but the valve open status is maintained.

In FIG. 1(c), as the injection screw 2 is revolved in reverse at the moved-back position, the plasticized material present in the screw is conveyed backward to reduce the pressure on the screw body side to a lower level than that on the metering side. Accordingly, the metered material starts flowing back as shown by the arrow. Also, because of the differential pressure between the metering side and the screw body side, the ring valve 3 is pushed by the metering side pressure back to the valve seat 24 side.

FIG. 1(d) illustrates that after the reverse revolution of the injection screw 2 is stopped, the injection screw 2 is forward moved to the moved-back position, and that the ring valve 3 is further pushed by the material resistance on the metering side back to the valve seat 24 side. This pushing-back causes the rear end of the ring valve 3 to come into contact with the valve seat 24 and closes the valve. Although this valve closing may not be completed owing to the pressure of the material present in a gap between the rear end of the ring valve 3 and the valve seat 24, because of an extremely narrow margin of gap in between, the state of proximity obtained is such as to make it difficult for the metered material to reverse its course.

When the injection screw 2 is forward moved after the halt for injecting the metered material, such material is pushed by pressure and injected from the nozzle 1a, while at the same time a pressure of the material greater than the above-mentioned differential pressure acts upon the front end surface of the ring valve 3. This pressure of the material rises with the forward movement of the injection screw 2 to such an extent that the ring valve 3 makes a pressure contact with the valve seat 24 while the tip of the screw head 21 moves in the stroke L from the position of metering completion to the temporary valve closing position which has been set for the same stroke as the above-mentioned transfer stroke T.

In this way, the reverse revolution of the screw at the moved-back position makes a valve closing stroke due to the forward movement of the injection screw after the reverse revolution equal to the stroke S plus the stroke L. As compared with the conventional method of closing the valve with only the stroke L up to the tentative valve closing position, the present invention secures a long valve closing stroke. Further, inasmuch as the pressure of the material is proportional to the length of the stroke required for valve opening, the ring valve 3 closes the valve with certainty before the temporary valve closing position is reached. Consequently, the dispersion of the injection quantities is reduced to considerably lower levels than before.

Figure 3A:
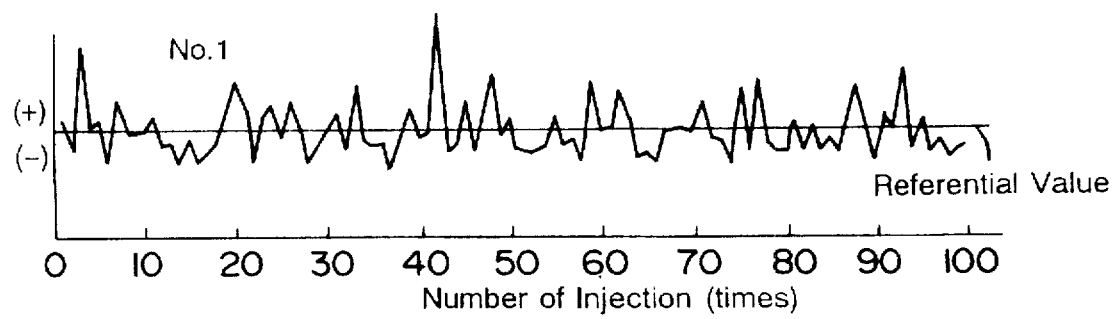
FIGS. 3(a), 3(b), and 3(c) are comparison diagrams of the weight dispersion of products according to the present invention and the conventional injection method.
Figure 3B:
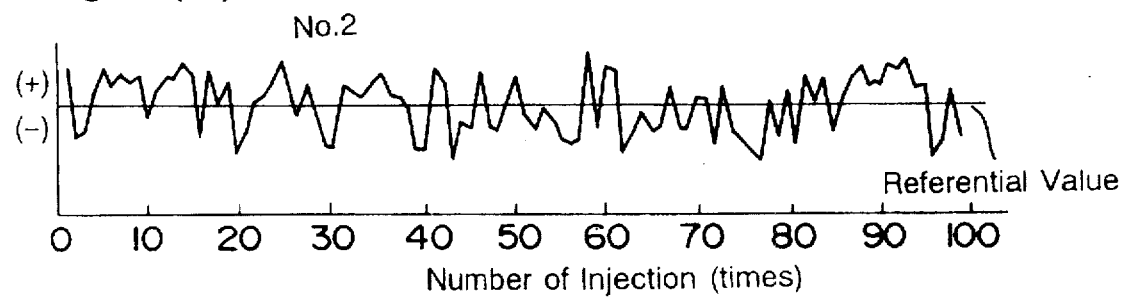
Figure 3C:
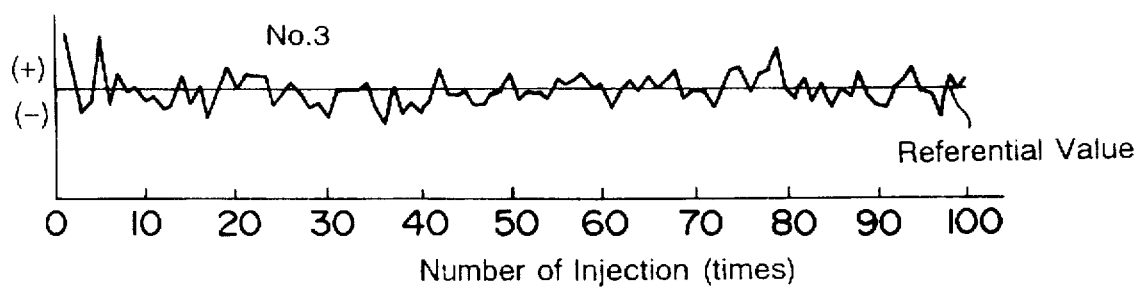

Comparative examples are shown in FIGS. 3(a) and 3(b).

No. 1; Injection forward movement from the position of metering completion (conventional normal method);

No. 2; Injection forward movement after reverse revolution at the position of metering completion (conventional reverse revolution method); and No. 3; Injection forward movement after reverse revolution at the moved-back position (according to the present invention).

Conditions; Strokes L, S, and T in the diagrams are all 4 mm, screw diameter is $\Phi 26$, reverse revolution is 1 revolution;

Molding material; polypropylene;

Molded articles; plastic models;

Measuring apparatus; electronic analytical scale (manufactured by Sartorius Co.); and Molding machine; motor-operated injection molding machine, MM30 M900006 (manufactured by Nissei Plastic Industrial Co., Ltd.).

As will be obviously understood from comparison examples, the present invention (No. 3) produces low levels of weight dispersion of the molded articles, thus contributing to the improvement of molding precision in a greater degree than the conventional method through reverse screw revolutions. It should also be pointed out that since the entire process from moving-back after completion of the metering through reverse revolutions and forward movement of the injection screw to injection can be performed as a series of injection process in the same way as before, no special operation is further required in the implementation of the present invention.

What is claimed is:

1. A method for injecting a molten resin by an injection machine which comprises a heating cylinder, an injection screw comprising a screw body, a screw head forming the tip of the injection screw, and a valve seat provided on the tip of the screw body, said injection screw being forward, backward and rotatively moved within said heating cylinder, and a ring valve mounted on the periphery of the screw head of the injection screw for preventing the reverse flow of the metered molten resin in contact with said valve seat, the method comprising the steps of;

opening the ring valve by the normal revolution of the injection screw thereof;

metering the molten resin;

stopping the revolution of said injection screw;

moving said injection screw backward, performing the reverse revolution of the injection screw at the moved-back position for the required amount to generate a differential pressure;

making the ring valve come in proximity to or into contact with the valve seat by said differential pressure; and injecting the metered resin by the forward movement of the injection screw so as to complete the closure of the ring valve.

2. A method for injecting a molten resin according to claim 1, wherein the forward movement of the injection screw is achieved simultaneously with the reverse revolution of the injection screw.

* * * * *